United States Patent
Kopansky et al.

(10) Patent No.: US 9,316,524 B2
(45) Date of Patent: Apr. 19, 2016

(54) VISUAL INDICATOR WITH SENSOR

(71) Applicant: Eaton Corporation, Cleveland, OH (US)

(72) Inventors: Gregory Kopansky, Philadelphia, PA (US); Rolland Tracy James, Collingswood, NJ (US); George Patrick Birch, Turnersville, NJ (US); Michael John Knox, Shamong, NJ (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/619,454

(22) Filed: Feb. 11, 2015

(65) Prior Publication Data

US 2015/0153213 A1 Jun. 4, 2015

Related U.S. Application Data

(63) Continuation-in-part of application No. 13/569,629, filed on Aug. 8, 2012.

(51) Int. Cl.
*G01F 23/284* (2006.01)
*G01F 23/292* (2006.01)
*G01F 23/02* (2006.01)

(52) U.S. Cl.
CPC ............ *G01F 23/2922* (2013.01); *G01F 23/02* (2013.01); *G01F 23/2925* (2013.01)

(58) Field of Classification Search
CPC ....... G01F 23/02; G01F 23/28; G01F 23/284; G01F 23/292; G01F 23/2921; G01F 23/2922; G01F 23/2925; G01F 23/2928

USPC ......... 250/577, 573, 574, 575, 576, 901, 900, 250/902, 903; 73/290 R, 293, 334, 323, 330, 73/331; 340/619

See application file for complete search history.

(56) References Cited

U.S. PATENT DOCUMENTS

| | | |
|---|---|---|
| 3,570,311 A | 3/1971 | Nelson |
| 3,817,625 A | 6/1974 | Jordan |
| 3,893,339 A | 7/1975 | Melone |
| 4,064,826 A | 12/1977 | Pauli |
| 4,206,537 A | 6/1980 | Meginnis |
| 4,363,240 A | 12/1982 | Mizusaki |
| 4,387,594 A | 6/1983 | Berthold |
| 4,397,182 A | 8/1983 | Bakul |
| 4,440,022 A | 4/1984 | Masom |
| 4,840,137 A | 6/1989 | Beauvais |
| 4,961,069 A | 10/1990 | Tsaprazis |
| 5,072,595 A | 12/1991 | Barbier |

(Continued)

FOREIGN PATENT DOCUMENTS

| | | |
|---|---|---|
| GB | 709194 | 5/1954 |
| WO | 8701025 | 2/1987 |

*Primary Examiner* — John Lee
(74) *Attorney, Agent, or Firm* — Benesch, Friedlander, Coplan & Aronoff LLP

(57) ABSTRACT

A fluid level gauge includes a housing having a first end and a second end, and a window disposed in the housing, proximate to the first end. The fluid level gauge further includes an optical sensor disposed in the housing, proximate to the second end. A prism is disposed in the housing, between the optical sensor and the window, such that the prism and the window define a fluid chamber therebetween. The housing further includes a plurality of through holes that provides a fluid path from outside the housing to the fluid chamber.

16 Claims, 3 Drawing Sheets

(56) References Cited

U.S. PATENT DOCUMENTS

| | | | |
|---|---|---|---|
| 5,072,616 A | 12/1991 | Sherrick | |
| 5,279,157 A | 1/1994 | Mattis | |
| 5,616,929 A | 4/1997 | Hara | |
| 5,763,776 A | 6/1998 | Birch | |
| 6,047,720 A | 4/2000 | Stein | |
| 6,131,471 A | 10/2000 | Okoren | |
| 6,161,395 A * | 12/2000 | Okoren | F04B 39/0207 340/619 |
| 6,276,901 B1 | 8/2001 | Farr et al. | |
| 6,359,742 B1 | 3/2002 | Canty | |
| 6,639,745 B1 | 10/2003 | Cheng | |
| 6,664,558 B1 | 12/2003 | Barbier | |
| 6,848,481 B1 | 2/2005 | Bay | |
| 7,040,728 B2 * | 5/2006 | Merz | B41J 2/17566 347/7 |
| 7,116,236 B2 | 10/2006 | Denietolis | |
| 7,157,727 B2 | 1/2007 | Kimura | |
| 7,199,388 B2 | 4/2007 | Omatoi | |
| 7,540,187 B1 | 6/2009 | Dillon | |
| 7,758,696 B2 | 7/2010 | Stoddard | |
| 7,788,973 B2 | 9/2010 | Quill | |
| 7,814,787 B2 | 10/2010 | Sabini | |
| 8,069,724 B2 | 12/2011 | Becherer | |
| 8,316,708 B2 | 11/2012 | Horst | |
| 8,604,455 B2 | 12/2013 | Wildschuetz | |
| 8,630,814 B2 | 1/2014 | Cheng | |
| 2005/0236592 A1 | 10/2005 | Wirthlin | |
| 2007/0240627 A1 | 10/2007 | Summer | |
| 2007/0251256 A1 | 11/2007 | Pham | |
| 2008/0022768 A1 | 1/2008 | Bell | |
| 2008/0053136 A1 | 3/2008 | Pham | |
| 2008/0066543 A1 | 3/2008 | Sabini | |
| 2008/0173088 A1 | 7/2008 | Quill | |
| 2009/0114012 A1 | 5/2009 | Becherer | |
| 2010/0000315 A1 * | 1/2010 | Ramus | A47J 31/44 73/293 |
| 2010/0011854 A1 | 1/2010 | De Sanzo | |
| 2011/0058961 A1 | 3/2011 | Sabini | |
| 2011/0139794 A1 | 6/2011 | Pham | |
| 2012/0279911 A1 | 11/2012 | Cofini | |
| 2014/0042345 A1 | 2/2014 | Kopansky | |
| 2015/0153213 A1 | 6/2015 | Kopansky | |

* cited by examiner

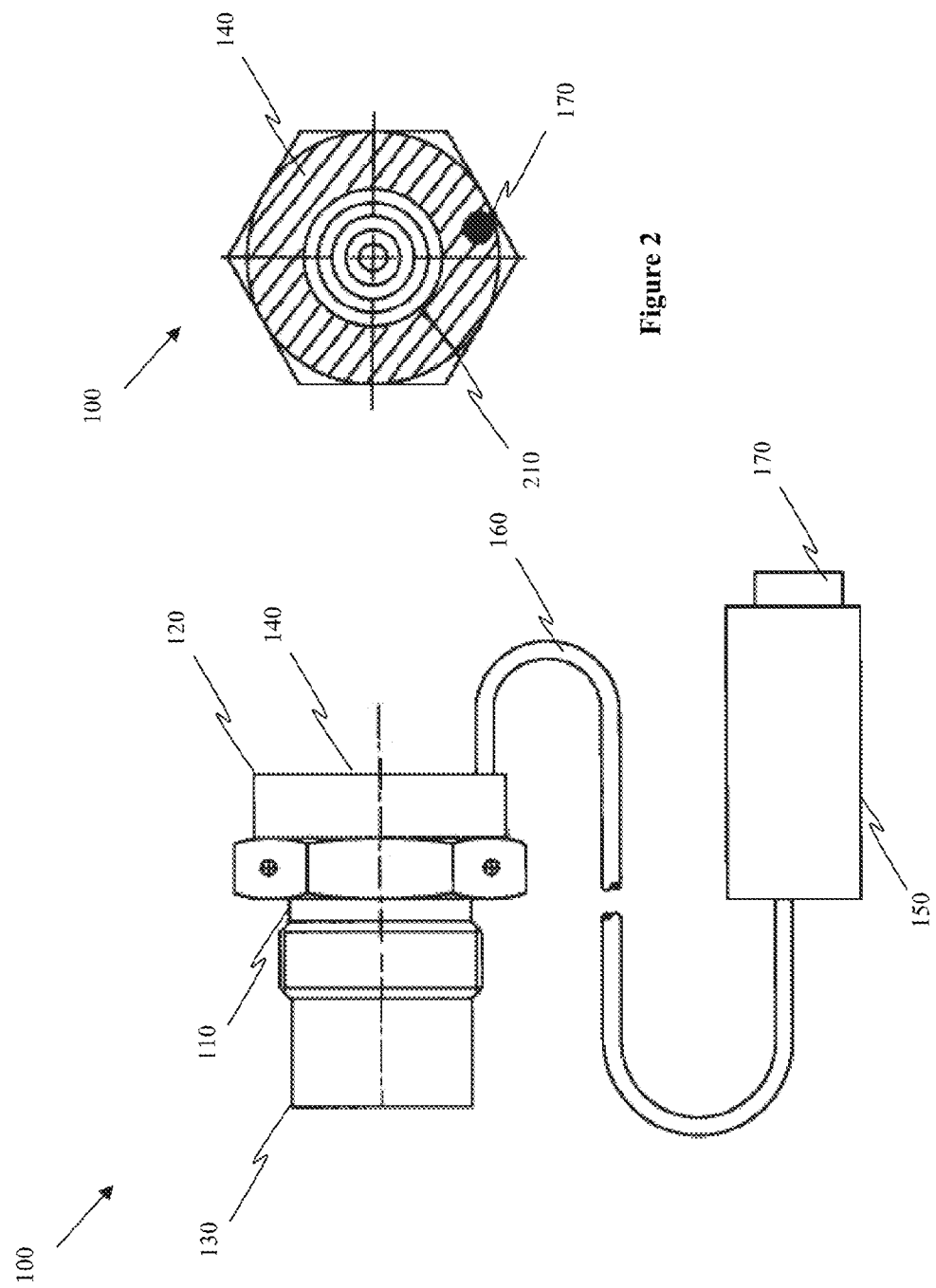

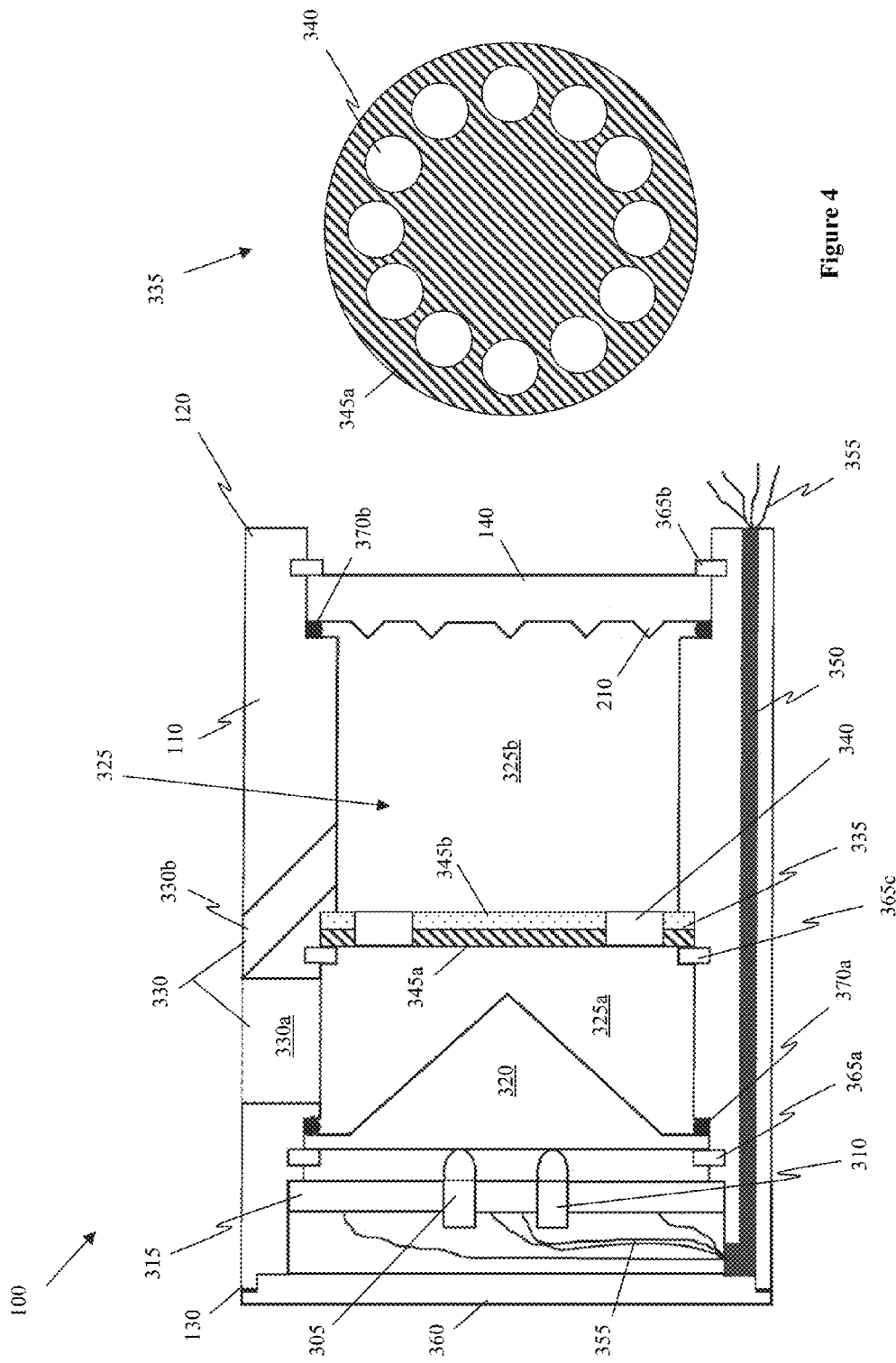

VISUAL INDICATOR WITH SENSOR

RELATED APPLICATIONS

This application is a continuation-in-part of U.S. patent application Ser. No. 13/569,629, filed on Aug. 8, 2012, entitled Visual Indictor with Sensor, currently pending.

FIELD OF INVENTION

The present disclosure relates to sight glasses. More particularly, the present disclosure relates to sight glasses having a visual indicator and an electro optic sensor for use in a splash lubricated environment, such as a gearbox.

BACKGROUND

A sight glass is a transparent tube through which an operator of a tank, boiler, gear box, or other machine can observe a level of liquid (such as oil or hydraulic fluid) contained within. A sight glass includes glass or a polymeric material that acts as a reflector when no liquid is present. When liquid is in contact with the glass or polymeric material, light passes through the sight glass. Accordingly, the presence of liquid in the system can be quickly verified. In other known systems, the sight glass is replaced with a sensor.

SUMMARY OF THE INVENTION

In one embodiment, a fluid level gauge includes a housing having a first end and a second end, and a window disposed in the housing, proximate to the first end. The fluid level gauge further includes an optical sensor including a prism, a light transmitter, and a light receiver disposed in the housing, proximate to the second end. The optical sensor and the window define a fluid chamber therebetween, with the light transmitter and the light receiving being disposed between the prism and the fluid chamber. The housing further includes a plurality of through holes that provides a fluid path from outside the housing to the fluid chamber.

In an additional embodiment, a fluid gauge includes a housing having a window disposed in a first end, and a sensor comprising a prism, a light transmitter, and light receiver disposed in a second end, with a fluid chamber disposed between the window and the light transmitter and the light receiver of the sensor. The housing includes a plurality of apertures that define a plurality of fluid paths to the fluid chamber. The window provides an unobstructed view of the fluid chamber to an operator. The window at least partially reflects light when the fluid chamber is empty, and light at least partially passes through the window when fluid is in contact with the window.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 1 is a side view of one embodiment of a fluid level gauge;

FIG. 2 is a front view of the fluid level gauge;
FIG. 3 is a cross-section of the fluid level gauge;
FIG. 4 is a front view of one embodiment of a light shield.

DETAILED DESCRIPTION

Figure 5:
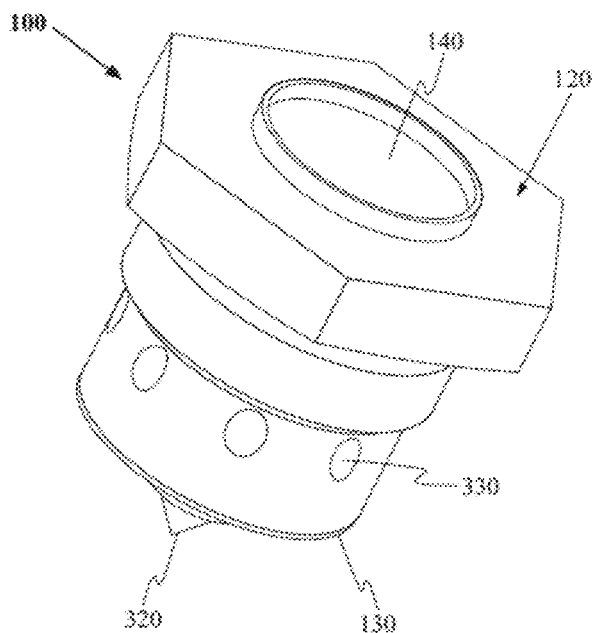
FIG. 5 is a perspective view of another embodiment of a fluid level gauge.

FIG. 1 illustrates a side view of one embodiment of a fluid level gauge 100. The fluid level gauge 100 may also be referred to as a liquid level gauge or a fluid gauge. The fluid level gauge 100 includes a housing 110 having a first end 120 and a second end 130, and a window 140 disposed in the housing 110, proximate to the first end 120.

The fluid level gauge 100 is configured to be placed in a fluid reservoir (not shown), such as a fluid tank in a vehicle or other machine, or a standalone fluid tank. The placement of the fluid gauge 100 is such that the first end 120 of the housing 110 extends outside of the reservoir, so that the window 140 may be viewed by an operator. The second end 130 of the housing is inside the machine and in contact with the fluid.

In the illustrated embodiment, the housing 110 includes a hexagonal portion, and several cylindrical portions of different diameters. However, it should be understood that the housing may take any shape that may be practical.

The fluid level gauge 100 further includes a pod 150 that is connected to the housing 110 by a cable 160. The pod 150 may include electronics (not shown), such as a processor, and a power source (not shown), such as a battery. The pod 150 may further include a connector, cables, or wires (not shown) to interface with a machine, such as a vehicle, computer, or any other external device. The pod may include an indicator 170 that conveys information to an operator. Exemplary indicators include, without limitation, light emitting diodes, incandescent lights, an LCD display, and a touch screen, a pop out indicator, or other electro-mechanical, non-volatile device. However, it should be understood that any electro-mechanical indicator, or other indicator may be used. It may be preferable to position the indicator at an accessible location.

FIG. 2 illustrates a front view of the fluid level gauge 100. As can be seen from this view, the window 140 may include a plurality of concentric circles 210. In one embodiment, the concentric circles are formed by ridges disposed on the window. In an alternative embodiment, the concentric circles 210 are etched into the window 140. In an alternative embodiment, the concentric circles are painted or otherwise adhered to the window 140.

The window 140 may also be referred to as a "sight glass" due to its function as a visual inspector and visual indicator of a fluid level. Although the window 140 may be referred to as a sight glass, it should be understood that the window 140 need not be constructed of glass, but may be constructed of a polymeric material. The window 140 at least partially reflects light when it is surrounded by air. However, when fluid is in contact with the window 140, the window 140 allows at least a portion of light to pass through. The window may be configured, such that when the fluid is at a minimum fluid level, light passes through at least a portion of the window 140. At any given fluid level, light that passes through the fluid at least partially passes through the window 140, and light that travels above the fluid is at least partially reflected by the window 140. In one embodiment, the window may be a Fresnel lens.

FIG. 3 illustrates a cross-section of the fluid level gauge 100. As can be seen from this view, the fluid level gauge 100 further includes an optical sensor including a light transmitter 305, a light receiver 310, and a prism 320 disposed in the housing 110, proximate to the second end 130 of the housing 110. In the illustrated embodiment, the sensor is in signal communication with a printed circuit board 315. The sensors may include infrared photosensors, photodiodes, phototransistors, or any photosensitive component. It should be understood that any light source and photosensing component may be used.

In the fluid level gauge 100, the prism 320 of the optical sensor is disposed in the housing 110, such that the prism 320 and the window 140 define a fluid chamber 325 therebetween. In one embodiment, the prism is constructed of a polymeric material. In other embodiments, the prism may be constructed of glass, fused silica (quartz), or other light transmitting material. In an alternative embodiment, the prism may be omitted and the device may instead employ one or more reflective surfaces to define one or more light paths.

The housing 110 further includes a plurality of through holes 330 that provides a fluid path from outside the housing to the fluid chamber 325. As can be seen in the illustrated embodiment, the window 140 provides an unobstructed view of the fluid chamber 325 to an operator. In the illustrated embodiment, the window 140 includes a plurality of ridges that define the concentric circles 210 that are visible to the operator. The ridges increase the contrast of visual indication by further bending light. In an alternative embodiment (not shown), the window may be flat. As one of ordinary skill would understand, the ridges may be more useful in instances where the fluid is similar in color to the window, or where the light must travel a relatively long distance.

A light shield 335 is disposed in the fluid chamber 325 between the prism 320 and the window 140, thereby defining a first fluid chamber 325a and a second fluid chamber 325b. In an alternative embodiment (not shown), a plurality of light shields are employed. In another alternative embodiment (not shown), the light shield is omitted entirely.

FIG. 4 illustrates a front view of the light shield 335. The features of the light shield 335 are described with reference to both FIGS. 3 and 4. The light shield 335 includes a plurality of apertures 340 that allow fluid to flow between the first fluid chamber 325a and the second fluid chamber 325b. While twelve apertures 340 are shown in the illustrated embodiment, it should be understood that any number of apertures may be employed. The apertures may be any shape. In an alternative embodiment (not shown), the light shield is a solid component without any apertures.

The light shield 335 includes a first side 345a that faces the prism 320, and a second side 345b that faces the window 140. In one embodiment, the first side 345a is formed of an infrared light absorbing material, including, without limitation, infrared absorbent paint, or an absolute black coating. The second side 345b may or may not need to absorb infrared light. It may be reflective. Accordingly, the second side 345b may be constructed of metal, such as aluminum or steel, or a polymeric material. However, it should be understood that the second side may be the same material as the first side. In an alternative embodiment, neither side is formed of an infrared light absorbing material.

With reference back to FIG. 3, the plurality of through holes 330 includes a first through hole 330a that provides a fluid path to the first fluid chamber 325a, and a second through hole 330b that provides a fluid path to the second fluid chamber 325b. In an alternative embodiment (not shown), the through holes only provide an external fluid path to one of the fluid chambers, and fluid passes between the first and second chamber via internal apertures.

The housing 110 also includes a bore 350 extending from the first end 120 to the second end 130. Wires 355 extend from the printed circuit board 310 through the bore 350 to the first end 120 of the housing 110. The wires may further extend through the cable 160 to the pod 150 and the indicator 170 or a connector or interface.

In operation, light is transmitted from the light transmitter 305, into the base of the prism 320. When fluid is not present in the fluid chamber 325, the presence of air causes the light to be internally reflected within the prism. Accordingly, light is reflected back to the light receiver 310. When the light is received by the light receiver 310, the printed circuit board 315 transmits a signal through the wires 355 to the pod 160, which provides an indication that the fluid level is low. It should be understood that the sensor may transmit information in the form of an output voltage via one or more output pins of a connector.

When fluid is present in the fluid chamber 325, light is transmitted through the prism and does not reach the light receiver 310. The pod 160 then indicates that the fluid level is acceptable.

A cover 360 is disposed on the second end 130 of the housing 110, covering the sensor components 305, 315, 320. The cover 360 prevents the sensor components 305, 310, 320 from being directly exposed to the fluid. The cover 360 may be transparent, translucent, or opaque.

In the illustrated embodiment, the prism 320 is affixed to the housing 110 by a first snap-on ring 365a and a first sealing o-ring 370a. The window 140 is affixed to the housing 110 by a second snap-on ring 365b and a second sealing o-ring 370b. The light shield 335 is affixed to the housing 110 by a third snap-on ring 365c. However it should be understood that any means may be employed to affix the components to the interior of the housing.

Figure 6:
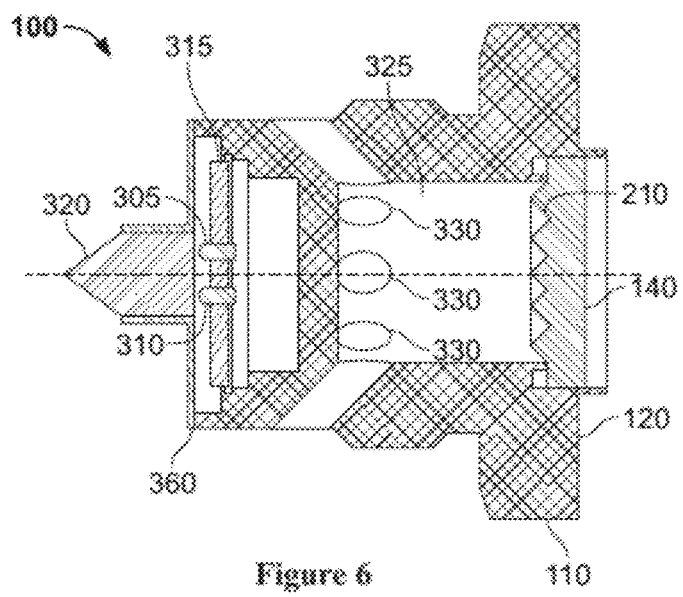
FIG. 6 is a cross-section of the fluid level gauge of FIG. 5.

In another embodiment, the fluid level gauge 100 may include a prism 320 that is disposed about its second end 130 and is in direct contact with the fluid, as shown in FIG. 5, rather than disposed within the housing 110, as described above. FIG. 6 is a cross-section view of the fluid level gauge 100 of FIG. 5.

As can be seen from FIG. 5, the fluid level gauge 100 includes an optical sensor that includes, in addition to the prism 320, a light transmitter 305 and a light receiver 310 disposed in the housing 110, proximate to the second end 130 of the housing 110. In the illustrated embodiment, the sensor is in signal communication with a printed circuit board 315. The sensors may include infrared photosensors, photodiodes, phototransistors, or any photosensitive component. It should be understood that any light source and photosensing component may be used.

In the fluid level gauge 100, the optical sensor is disposed such that the sensor components and the window 140 define a fluid chamber 325 therebetween. The housing 110 further includes a plurality of through holes 330 that provide a fluid path from outside the housing to the fluid chamber 325. As can be seen in the illustrated embodiment, the window 140 provides an unobstructed view of the fluid chamber 325 to an operator. In the illustrated embodiment, the window 140 includes a plurality of ridges that define the concentric circles 210 that are visible to the operator. The ridges increase the contrast of visual indication by further bending light. In an alternative embodiment (not shown), the window may be flat. As one of ordinary skill would understand, the ridges may be more useful in instances where the fluid is similar in color to the window, or where the light must travel a relatively long distance.

A cover 360 is disposed on the second end 130 of the housing 110, covering the sensor components 305, 315. The cover 360 prevents the sensor components 305, 310 from being directly exposed to the fluid. The cover 360 may be transparent, translucent, or opaque. In one embodiment, the cover 360 may be made of a metallic material, such as steel or aluminum.

In this embodiment, the fluid level indicator 100 is capable of displaying the presence or absence of fluid in a splash lubricated environment. For example, while at rest or at a steady stage, an operator may use the visual indicator, or window 140, to determine the fluid level within the gauge 100. In addition, because the prism 320 is immersed in fluid, the proper fluid level may be electronically indicated.

And, when the gears of the gearbox, for example, are active, the splashing action of the gearbox is enabled, resulting in fluid droplets covering the tip of the prism 320. When present on the prism 320, the presence of the fluid may be electronically sensed. Conversely, if there is not enough fluid present in the gearbox, the amount of fluid droplets covering the tip of the prism 320, is reduced and the absence of fluid is electronically indicated.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A fluid level gauge comprising:
    a housing having a first end and a second end;
    a window disposed in the housing, proximate to the first end;
    an optical sensor comprising a prism, a light transmitter, and a light receiver disposed in the housing, proximate to the second end such that the optical sensor and the window define a fluid chamber therebetween, wherein the light transmitter and the light receiver are disposed between the prism and the fluid chamber; and
    wherein the housing further includes a plurality of through holes that provides a fluid path from outside the housing to the fluid chamber.

2. The fluid level gauge of claim 1, wherein the window provides an unobstructed view of the fluid chamber to an operator.

3. The fluid level gauge of claim 1, wherein the optical sensor further comprises a printed circuit board.

4. The fluid level gauge of claim 3, wherein the housing includes a bore extending from the first end to the second end, and wherein wires extend from the printed circuit board through the bore to the first end of the housing and to an indicator.

5. The fluid level gauge of claim 1, further comprising a cover disposed on the second end of the housing.

6. The fluid level gauge of claim 1, wherein at least a portion of the prism is disposed outside the housing.

7. A fluid gauge comprising:
    a housing having a window disposed in a first end, and a sensor comprising a prism, a light transmitter, and a light receiver disposed in a second end, with a fluid chamber disposed between the window and the sensor,
        wherein the housing includes a plurality of apertures that define a plurality of fluid paths to the fluid chamber and wherein the light transmitter and the light receiver are disposed between the prism and the fluid chamber,
        wherein the window provides an unobstructed view of the fluid chamber to an operator, and
        wherein the window at least partially reflects light when the fluid chamber is empty, and light at least partially passes through the window when fluid is in contact with the window.

8. The fluid level gauge of claim 7, wherein at least a portion of the prism is disposed outside the housing.

9. The fluid gauge of claim 7, wherein the window is constructed of a material selected from the group consisting of glass and a polymeric material.

10. The fluid gauge of claim 7, wherein the sensor is in signal communication with an indicator selected from the group consisting of a light emitting diode, an incandescent light, and a liquid crystal display.

11. The fluid gauge of claim 7, wherein the window includes a plurality of visible concentric circles that can be either molded into the window or printed thereon.

12. The fluid gauge of claim 7, wherein the window has a flat outer surface and a flat inner surface.

13. A liquid level indicator comprising:
    a hollow housing defining a liquid chamber, the housing having a plurality of apertures defining a liquid path to the liquid chamber;
    a window disposed proximate to a first end of the hollow housing; and
    an optical sensor comprising a prism, a light transmitter, and a light receiver disposed proximate to the second end of the hollowing housing; wherein the light transmitter and the light receiver are disposed between the prism and the liquid chamber.

14. The liquid level indicator of claim 13, wherein the window at least partially reflects light when the liquid chamber is empty, and light at least partially passes through the window when liquid is present in the liquid chamber and in contact with the window.

15. The liquid level indicator of claim 13, further comprising a seal adjacent the window.

16. The fluid level gauge of claim 13, wherein at least a portion of the prism is disposed outside the housing.

* * * * *